UNITED STATES PATENT OFFICE.

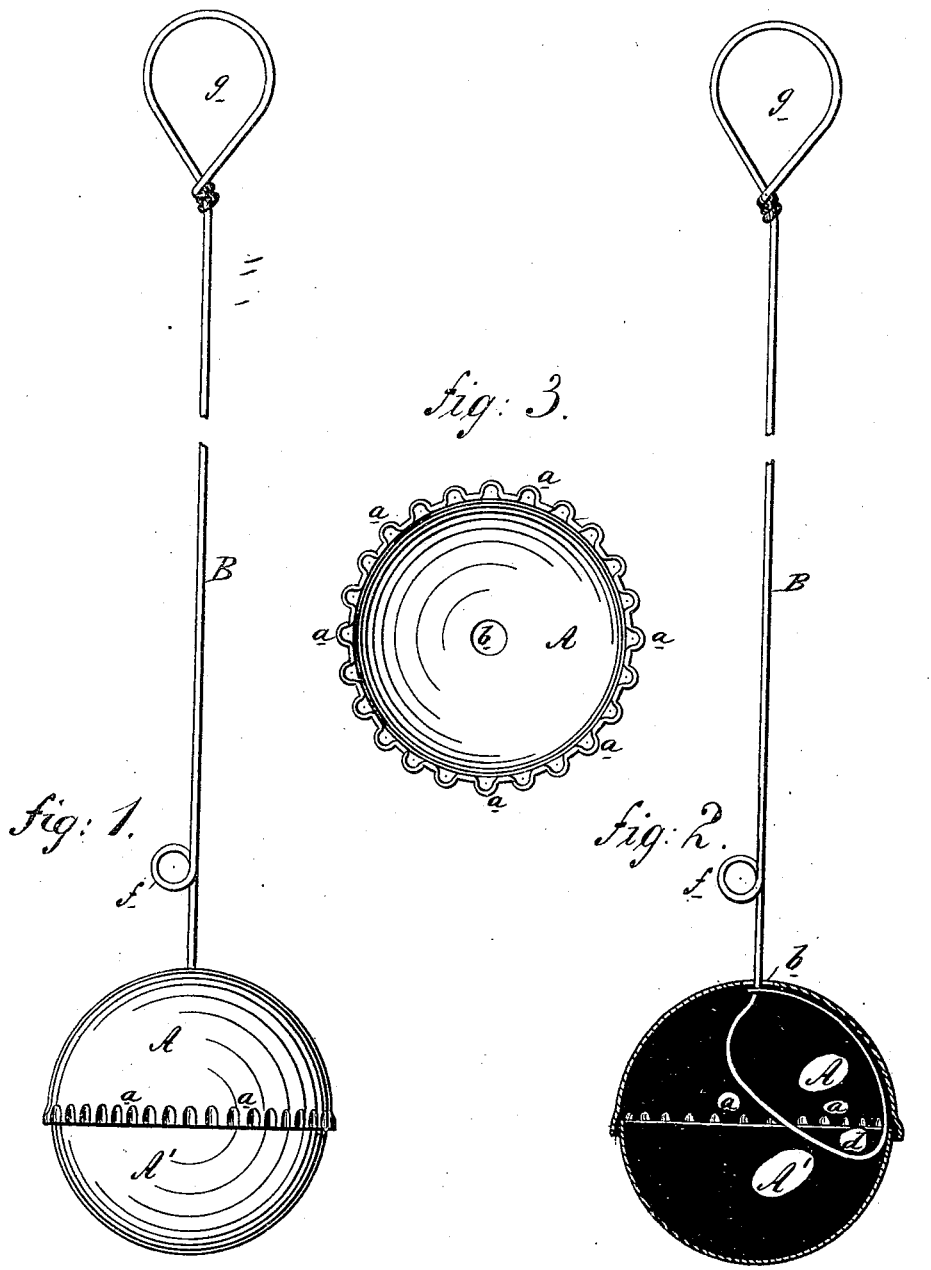

DANIEL DUNSCOMB, OF NEW YORK, N. Y.

BLUING-PACKAGE.

SPECIFICATION forming part of Letters Patent No. 242,286, dated May 31, 1881.

Application filed March 5, 1881. (No model.)

*To all whom it may concern:*

Be it known that I, DANIEL DUNSCOMB, of the city, county, and State of New York, have invented a new and Improved Bluing-Package, of which the following is a specification.

The object of this invention is to provide an improved package or receptacle in which granulated or lump bluing can be placed for transportation or use.

The invention consists of two hemispheres, preferably of metal, fitted to or upon each other so as to form a sphere, which is suspended so that it can rotate from a handle of wire or other suitable material that enters centrally into the upper hemisphere, and has its entered end bent or looped so as to form a stirrer for agitating the contents of the receptacle.

Figure 1 is an elevation of the device. Fig. 2 is a sectional elevation of the same. Fig. 3 is a plan of the concave face of the upper hemisphere.

Similar letters of reference indicate corresponding parts.

In the drawings, A represents the upper hemisphere or cover, having a slightly corrugated edge, as shown at $a$, that is readily formed in striking up the said hemisphere A in a die, and $b$ is a central perforation in said hemisphere A, through which is passed the handle B.

A' represents the lower hemisphere, over the rim of which the rim of the hemisphere A is fitted so as to hold the two parts tightly together, while at the same time communication from the interior of the sphere may be had through the corrugations $a$.

The handle B is preferably of stiff wire, and is entered through the aperture $b$ in the hemisphere A, which aperture $b$ is of a little larger diameter than the wire B in order to permit the free play or rotation of the receptacle about said handle B, and in order to afford a free communication to the interior of said receptacle.

That end of the handle B that is entered into the said receptacle or package A A' is looped or bent, as shown at $d$, in order that it may reach to the bottom and sides of said receptacle or package A A' to agitate the contents thereof, and that it may secure the handle B in the package A A'.

On said handle B, above the package or receptacle A A', a small loop or shoulder, $f$, is formed, to prevent the looped end $d$ of said handle B from pressing down into the hemisphere A' with sufficient force to push the two hemispheres A A' apart, and also to prevent the hemisphere A from moving upward on said handle B. At the upper extremity of the handle B is a loop, $g$, for convenience of handling the device and for suspending it when not in use.

The operator, taking hold of the handle B, introduces the receptacle A A', which is to be filled with bluing in small lumps or in a granulated condition, into the water that is to be used, and moves said receptacle A A' about therein with a circular or rotary motion, thereby causing said receptacle A A' to rotate slightly about its axis—the handle B, The water, entering the corrugations $a$ and aperture $b$, rapidly dissolves the contained bluing, which escapes through said corrugations $a$ and aperture $b$. When sufficient bluing has escaped into the water the package or receptacle A A' is withdrawn and suspended by the handle B in some convenient place for further use.

The corrugations $a$ and the aperture $b$ do not permit the escape of the granulated bluing, which is to be packed in the receptacles A A', said corrugations and aperture being of insufficient size.

When the contents of this package or receptacle are dissolved out it can be opened and refilled for further use.

The package may be coated inside and outside with some water-proof varnish or other material to prevent rust.

Having thus described my invention, I claim as new and desire to secure by Letters Patent—

1. The combination, with the spherical bluing-package A A', of the handle B, having a looped or bent end, $d$, arranged and operated substantially as herein shown and described, whereby the package and handle are held together and the contents of the package are agitated, as set forth.

2. In a bluing-package, the cover A, provided with rim-corrugations $a\,a$, substantially as herein shown, and for the purpose described.

DANIEL DUNSCOMB.

Witnesses:
 I. I. STORER,
 C. SEDGWICK.